US012775545B2

(12) United States Patent
Suda et al.

(10) Patent No.: US 12,775,545 B2
(45) Date of Patent: Oct. 27, 2026

(54) INFORMATION PROCESSING APPARATUS, INFORMATION PROCESSING SYSTEM, AND INFORMATION PROCESSING METHOD

(71) Applicant: Panasonic Automotive Systems Co., Ltd., Kanagawa (JP)

(72) Inventors: Seiya Suda, Kanagawa (JP); Toshinari Morikawa, Kanagawa (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 268 days.

(21) Appl. No.: 18/601,360

(22) Filed: Mar. 11, 2024

(65) Prior Publication Data

US 2024/0311283 A1 Sep. 19, 2024

(30) Foreign Application Priority Data

Mar. 17, 2023 (JP) ................................ 2023-043009

(51) Int. Cl.
*G06F 11/3668* (2025.01)
*G06F 9/50* (2006.01)

(52) U.S. Cl.
CPC ........ *G06F 11/3688* (2013.01); *G06F 9/5027* (2013.01)

(58) Field of Classification Search
CPC .......................... G06F 11/3688; G06F 9/5027
USPC .......................................................... 717/124
See application file for complete search history.

(56) References Cited

U.S. PATENT DOCUMENTS

| | | | | |
|---|---|---|---|---|
| 11,799,598 B2 * | 10/2023 | Tsukidate | .............. | G06F 9/4881 |
| 12,108,255 B2 * | 10/2024 | Shimamura | ........... | G06F 21/554 |
| 12,487,900 B2 * | 12/2025 | Gokhale | ................ | G06F 11/08 |

(Continued)

FOREIGN PATENT DOCUMENTS

| | | |
|---|---|---|
| JP | 2020/038436 | 3/2020 |
| JP | 2021/047561 | 3/2021 |

(Continued)

OTHER PUBLICATIONS

Bucur, Stefan, et al. "Parallel symbolic execution for automated real-world software testing." Proceedings of the sixth conference on Computer systems. 2011. pp. 183-189. (Year: 2011).*

(Continued)

*Primary Examiner* — Satish Rampuria
(74) *Attorney, Agent, or Firm* — Greenblum & Bernstein, P.L.C.

(57) ABSTRACT

An adjustment apparatus acquires first time information related to time in which a automotive apparatus executes a predetermined process. The adjustment apparatus acquires second time information related to time in which a cloud server executes the predetermined process, the cloud server executing a test of software operating on the automotive apparatus and having a processing speed higher than that of the automotive apparatus. The adjustment apparatus determines a value of a parameter related to execution of a process in the cloud server so as to reduce a difference between the automotive apparatus and the cloud server based on the first time information and the second time information. The adjustment apparatus sets the value of the parameter determined in the cloud server.

6 Claims, 9 Drawing Sheets

(56) References Cited

U.S. PATENT DOCUMENTS

| | | | | |
|---|---|---|---|---|
| 2014/0156735 | A1* | 6/2014 | Yamasaki | G06F 9/5027 709/203 |
| 2017/0075327 | A1* | 3/2017 | Okada | G05B 19/042 |
| 2018/0329943 | A1* | 11/2018 | Li | G06F 9/5027 |
| 2019/0300011 | A1* | 10/2019 | Nakano | B60R 16/023 |
| 2021/0248288 | A1* | 8/2021 | Murashima | G06F 11/3419 |
| 2022/0156118 | A1 | 5/2022 | Furusawa | |

FOREIGN PATENT DOCUMENTS

| | | |
|---|---|---|
| JP | 2022-078815 | 5/2022 |
| JP | 2022/080171 | 5/2022 |
| WO | 2020/017264 | 1/2020 |

OTHER PUBLICATIONS

Gemlau, Kai-Björn, et al. "System-level logical execution time: Augmenting the logical execution time paradigm for distributed real-time automotive software." ACM Transactions on Cyber-Physical Systems 5.2 (2021): pp. 1-27. (Year: 2021).*

Esen, Hasan, et al. "Control as a service (CaaS) cloud-based software architecture for automotive control applications." Proceedings of the Second International Workshop on the Swarm at the Edge of the Cloud. 2015. pp. 13-18. (Year: 2015).*

Kovačić, Nikola, et al. "Validation of process execution on automotive embedded devices." 2017 13th International Conference on Advanced Technologies, Systems and Services in Telecommunications (TELSIKS). IEEE, 2017. pp. 435-438. (Year: 2017).*

Feiertag, Nico, et al. "A compositional framework for end-to-end path delay calculation of automotive systems under different path semantics." IEEE Real-Time Systems Symposium: Nov. 30, 2009-Dec. 3, 2009. IEEE Communications Society, 2009. pp. 1-8. (Year: 2009).*

Sangiovanni-Vincentelli, Alberto, and Marco Di Natale. "Embedded system design for automotive applications." Computer 40.10 (2007): pp. 42-51. (Year: 2007).*

Notice of Reasons for Refusal for Japanese Patent App. No. 2023-043009, dated Jan. 28, 2025, with English translation.

* cited by examiner

FIG. 9

| PROCESS | CLOUD SERVER PROCESS START TIME | CLOUD SERVER PROCESSING TIME | AUTOMOTIVE APPARATUS PROCESS START TIME | AUTOMOTIVE APPARATUS PROCESSING TIME | PROCESSING TIME DIFFERENCE |
|---|---|---|---|---|---|
| 1 | 0. 00000 | 0. 00113 | 0. 00000 | 0. 00313 | 0. 00200 |
| 2 | 0. 00113 | 0. 00100 | 0. 00313 | 0. 00100 | 0. 00000 |
| 3 | 0. 00213 | 0. 00100 | 0. 00413 | 0. 00308 | 0. 00208 |
| 4 | 0. 00313 | 0. 00087 | 0. 00721 | | |
| 5 | 0. 00400 | 0. 00163 | | | |
| 6 | 0. 00563 | 0. 00150 | | | |
| 7 | 0. 00713 | | | | |

INFORMATION PROCESSING APPARATUS, INFORMATION PROCESSING SYSTEM, AND INFORMATION PROCESSING METHOD

BACKGROUND

1. Field

The present disclosure relates to a data processing technology and, in particular, to an information processing apparatus, an information processing system, and an information processing method.

2. Description of the Related Art

Development of virtualized infrastructure software (also called "hypervisor") has been undertaken in order to make effective use of hardware resources of a computer. Patent literature 1 proposes a cloud system in which, for each of a plurality of virtual machines operating on selected one (s) of a plurality of physical machines, the resource usage trend in each virtual machine is updated, and the physical machines on which the plurality of virtual machines operate are changed based on the updated resource usage trend.

[Patent literature 1] JP2020-38436

In recent years, efforts have been started, for the purpose of increasing the efficiency of development of ECUs (Electronic Control Units) installed in vehicles or developed for vehicles, to virtualize ECUs and to develop, on a cloud server, virtual ECU software that runs on a hypervisor. Even when development is carried out on a cloud server, it is mandatory to test and evaluate the virtual ECU software by using actual computer hardware installed in the vehicle or developed for vehicle (it is the execution environment for the virtual ECU software and will also be referred to as "automotive hardware" hereinafter).

There is a performance difference between a cloud server and automotive hardware. In other words, the processing speed of a cloud server is higher than that of automotive hardware. When the virtual ECU software developed on a cloud server is tested on automotive hardware, therefore, problems attributable to this performance difference may occur, which could require rework during a test on the automotive hardware.

SUMMARY

The present disclosure addresses the issue described above, and a purpose thereof is to provide a technology for suppressing a decrease in development efficiency when developing software operating on the first apparatus by using the second apparatus having a higher processing speed than the first apparatus.

An information processing apparatus according to an embodiment of the present disclosure includes: a first acquisitioner that acquires first time information related to time in which a first apparatus executes a predetermined process; a second acquisitioner that acquires second time information related to time in which a second apparatus executes the predetermined process, the second apparatus executing a test of software operating on the first apparatus and having a processing speed higher than that of the first apparatus; a determinator that determines a value of a parameter related to execution of a process in the second apparatus so as to reduce a difference between the first apparatus and the second apparatus based on the first time information and the second time information; and a setter that sets the value of the parameter determined by the determinator in the second apparatus.

Another embodiment of the present disclosure relates to an information processing system. The information processing system includes: a first acquisitioner that acquires first time information related to time in which a first apparatus executes a predetermined process; a second acquisitioner that acquires second time information related to time in which a second apparatus executes the predetermined process, the second apparatus executing a test of software operating on the first apparatus and having a processing speed higher than that of the first apparatus; a determinator that determines a value of a parameter related to execution of a process in the second apparatus so as to reduce a difference between the first time information and the second time information; and a setter that sets the value of the parameter determined by the determinator in the second apparatus.

Still another embodiment of the present disclosure relates to an information processing method. The method includes: acquiring first time information related to time in which a first apparatus executes a predetermined process; acquiring second time information related to time in which a second apparatus executes the predetermined process, the second apparatus executing a test of software operating on the first apparatus and having a processing speed higher than that of the first apparatus; determining a value of a parameter related to execution of a process in the second apparatus so as to reduce a difference between the first time information and the second time information; and setting the value of the parameter determined in the second apparatus.

Optional combinations of the aforementioned constituting elements, and implementations of the present disclosure in the form of computer programs and recording mediums recording computer programs may also be practiced as additional modes of the present disclosure.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 9 shows an example of analysis information;

DETAILED DESCRIPTION OF THE EMBODIMENTS

The invention will now be described by reference to the preferred embodiments. This does not intend to limit the scope of the present invention, but to exemplify the invention.

The apparatus or the entity that executes the method according to the disclosure is provided with a computer. By causing the computer to run a program, the function of the apparatus or the entity that executes the method according to the disclosure is realized. The computer is comprised of a processor that operates in accordance with the program as a main hardware feature. The disclosure is non-limiting as to the type of the processor so long as the function is realized by running the program. The processor is comprised of one or a plurality of electronic circuits including a semiconductor integrated circuit (IC) or a large-scale integration (LSI). The terms IC and LSI may change depending on the level of integration, and the processor may be comprised of a system LSI, a Very Large Scale Integration (VLSI), or an Ultra Large Scale Integration (ULSI). A field programmable gate array (FPGA), which is programmed after an LSI is manufactured, or a reconfigurable logic device, in which connections inside the LSI can be reconfigured or circuit compartments inside the LSI can be set up, can be used for the same purpose. The plurality of electronic circuits may be integrated in one chip or provided in a plurality of chips. The former is called system on tip (System on Chip) (SoC). The plurality of chips may be aggregated in one device or provided in a plurality of devices. The program may be recorded in a computer-readable non-transitory recording medium such as a read only memory (ROM), an optical disk, and a hard disk drive or recorded in a computer-readable transitory storage medium such as a random access memory (RAM). The program may be stored in a recording medium in advance or supplied to a recording medium or a recording medium via wide area communication network including the Internet.

An outline of an embodiment will be described. Efforts have been started, for the purpose of increasing the efficiency of development of ECUs installed in vehicles or developed for vehicles, to virtualize ECUs and to develop, on a cloud server, virtual ECU software that runs on a hypervisor. Virtual ECU software can also be said to be a virtual ECU-VM (Virtual Machine) and may also be simply referred to as a "virtual ECU" hereinafter. A cloud server is a virtual server built by a cloud provider or a server for in-house development.

Figure 1A:
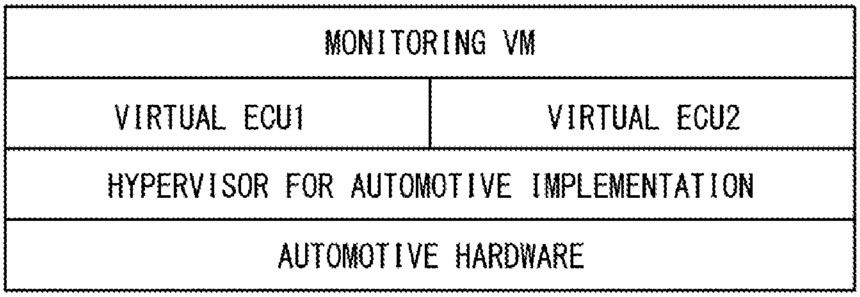
FIGS. 1A and 1B schematically show the operating environment of a virtual ECU.
Figure 1B:
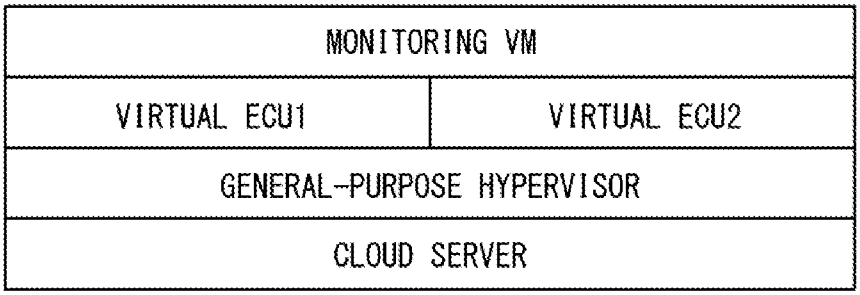

FIGS. 1A and 1B schematically show the operating environment of a virtual ECU. FIG. 1A shows the operating environment in a real machine. The virtual ECU 1 and the virtual ECU 2 run on a hypervisor for automotive implementation on the computer hardware (automotive hardware) installed in a vehicle or developed for vehicle. The virtual ECU 1 may execute, for example, a process related to steering control. The virtual ECU 2 may execute, for example, a process related to infotainment.

FIG. 1B shows the operating environment during development and testing on a cloud. The virtual ECU 1 and the virtual ECU 2 run on a general-purpose hypervisor on a cloud server. The monitoring VM shown in FIGS. 1A and 1B is a VM that executes processes related to monitoring, analysis, verification, and evaluation of other VMs that run on the hypervisor (e.g., the virtual ECU1 and the virtual ECU2).

Figure 2:
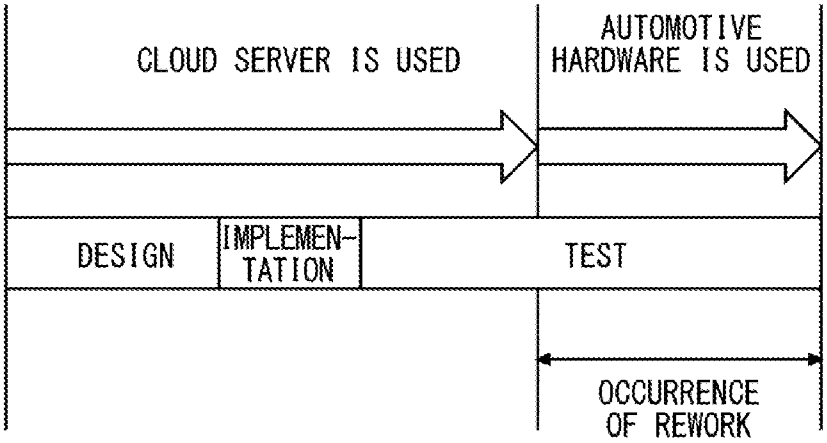
FIG. 2 schematically shows an issue addressed when a virtual ECU is developed on a cloud server.

FIG. 2 schematically shows an issue addressed when a virtual ECU is developed on a cloud server. In general, a cloud server has a higher processing speed than automotive hardware. When a virtual ECU developed on a cloud server is tested on automotive hardware, therefore, bugs attributable to hardware difference, failure to meet QoS (Quality of Service) requirements, etc. may occur. As a result, rework may be required during a test on automotive hardware. "Design" and "test" in FIG. 2 may be equated with design and verification process in a group of software engineering processes in Automotive SPICE (Software Process Improvement and Capability dEtermination) standard or can be thought of as "design" and "test" in a software development scheme that is not limited to automotive software (e.g., DevOps).

Figure 3:
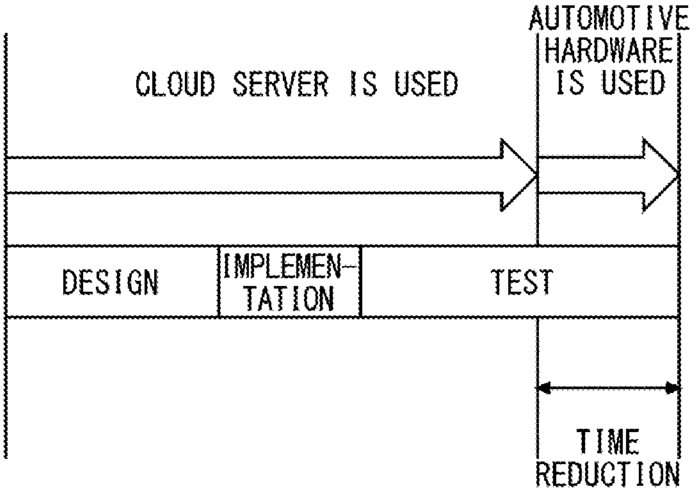
FIG. 3 schematically illustrates the development of a virtual ECU in the embodiment.

FIG. 3 schematically illustrates the development of a virtual ECU in the embodiment. In the embodiment, the process of the virtual ECU on the cloud server is controlled so as to reduce a gap between the processing time of the virtual ECU on the cloud server and the processing time of the virtual ECU on the automotive hardware. The processing time can also be said to be the processing speed. This suppresses the occurrence of bugs, failure to meet QoS requirements, etc. in a test of the virtual ECs using the automotive hardware. In other words, rework at the test stage using the automotive hardware can be suppressed, and a decrease in the development efficiency of the virtual ECU can be suppressed.

Figure 4:
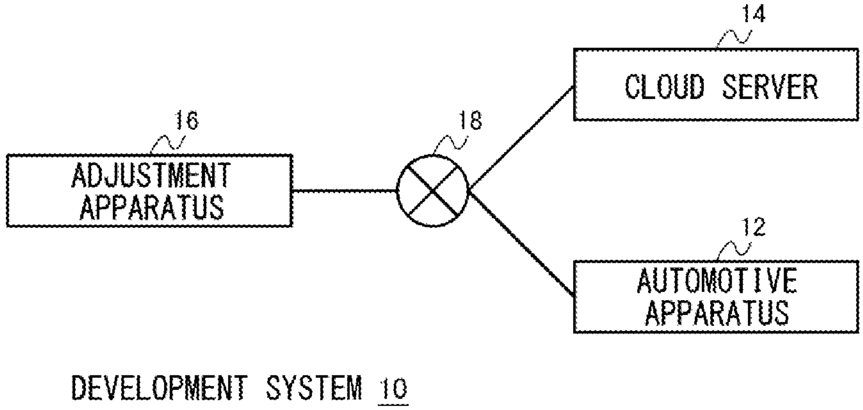
FIG. 4 shows a configuration of a development system of the embodiment.

Hereinafter, the technology of the embodiment will be described in detail. FIG. 4 shows a configuration of a development system 10 of the embodiment. The development system 10 is an information processing system including a automotive apparatus 12, a cloud server 14, and an adjustment apparatus 16. These apparatuses are connected via a communication network 18 including LAN, WAN, Internet, etc.

The automotive apparatus 12 is an information processing apparatus that corresponds to the automotive hardware of FIG. 1A and executes processes related to real machine test of the virtual ECU. The cloud server 14 is an information processing apparatus that corresponds to the cloud server of FIG. 1B and executes processes related to the development and test of the virtual ECU. The cloud server 14 has a higher processing speed than the automotive apparatus 12, i.e., the time required for the process of the virtual ECU is shorter. The adjustment apparatus 16 is an information processing apparatus that makes adjustment to reduce the difference in processing time between the automotive apparatus 12 and the cloud server 14, i.e., make adjustment to bring the processing speed of the two apparatuses closer to each other.

Figure 5:
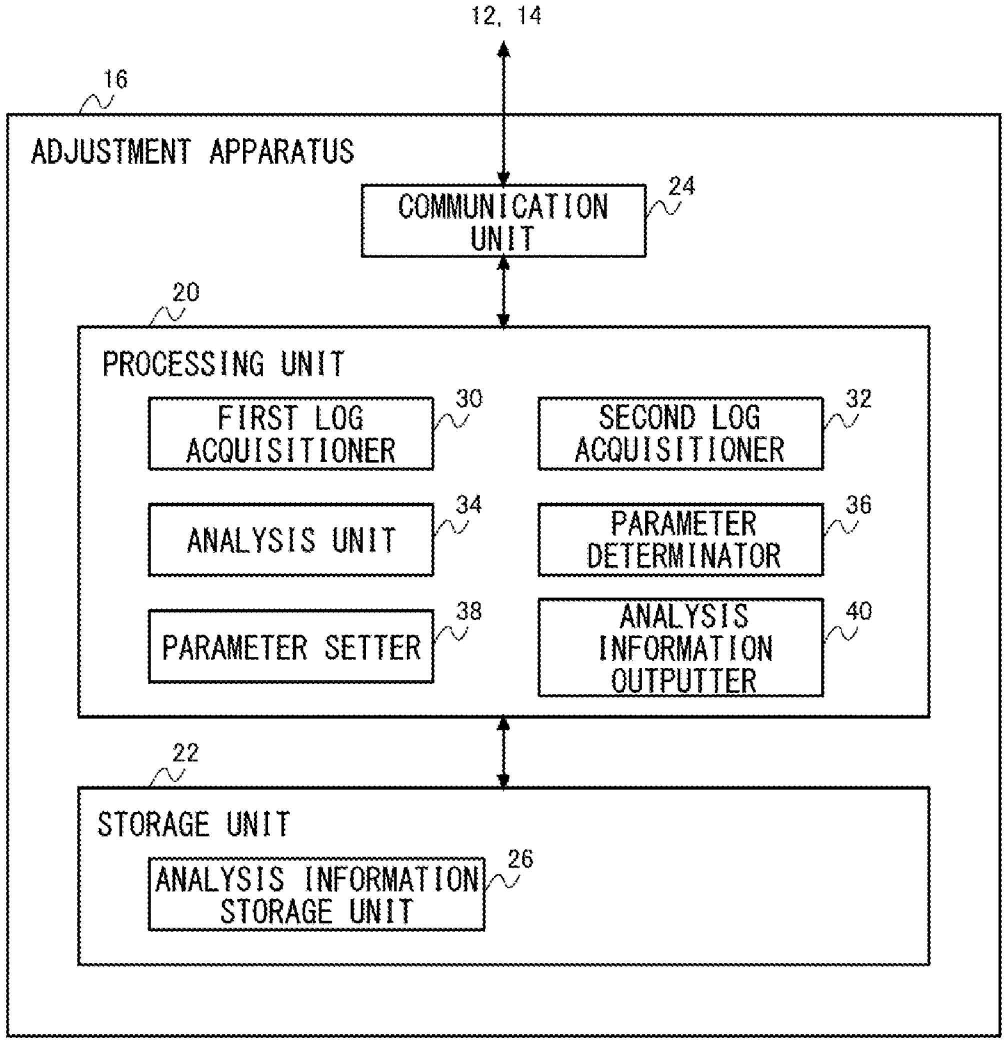
FIG. 5 is a block diagram showing functional blocks of the adjustment apparatus of FIG. 4.

FIG. 5 is a block diagram showing functional blocks of the adjustment apparatus of FIG. 4. The blocks shown in the block diagrams of the present disclosure are implemented in hardware such as processors and storage apparatuses exemplified by a CPU and a memory of a computer, and in software such as a computer program. FIG. 5 depicts functional blocks implemented by the cooperation of those. It will be understood by those skilled in the art that these functional blocks are implemented in a variety of manners by a combination of hardware and software.

The adjustment apparatus 16 includes a processing unit 20, a storage unit 22, and a communication unit 24. The processing unit 20 executes various data processes related to the above adjustment. The storage unit 22 stores data referenced or updated by the processing unit 20. The communication unit 24 communicates with an external device according to a predetermined communication protocol. The processing unit 20 transmits/receives data to and from the automotive apparatus 12 via the communication unit 24 and transmits/receives data to and from the cloud server 14.

The storage unit 22 includes an analysis information storage unit 26. The analysis information storage unit 26 stores analysis information that is the result of analysis based on the first log and the second log described later. The analysis information can be said to be information related to the execution time of a predetermined data process for measuring the processing time in each of the automotive apparatus 12 and the cloud server 14. In other words, the analysis information can be said to be information related to the execution speed of the predetermined data process in each of the automotive apparatus 12 and the cloud server 14. In the embodiment, the predetermined data process for measuring the processing time is the process of the virtual ECU under test. In a variation, the predetermined data process may be an extract of a typical process of the virtual ECU. Further, when developing a next-generation model of the virtual ECU, the process of the current-generation model of the virtual ECU may be used as the predetermined data process above.

The processing unit 20 includes a first log acquisitioner 30, a second log acquisitioner 32, an analysis unit 34, a parameter determinator 36, a parameter setter 38, and an analysis information outputter 40. The functions of these plurality of function blocks may be implemented in a computer program (also referred to here as a "adjustment program"). The adjustment program may be stored in a recording medium and installed in the storage of the adjustment apparatus 16 via the recording medium, or may be downloaded via a network and installed in the storage of the adjustment apparatus 16. The processor (CPU, etc.) of the adjustment apparatus 16 may exhibit the functions of the plurality of above function blocks by reading the adjustment program into the main memory and executing the program.

The first log acquisitioner 30 acquires the first log including the first time information related to the time in which the automotive apparatus 12 executed the process of the virtual ECU. The second log acquisitioner 32 acquires the second log including second time information related to the time in which the cloud server 14 executed the process of the virtual ECU.

The analysis unit 34 generates analysis information related to the difference between the first time information indicated by the first log and the second time information indicated by the second log. The analysis information can be said to be information indicating the difference between the automotive apparatus 12 and the cloud server 14. The analysis unit 34 stores the generated analysis information in the analysis information storage unit 26.

The parameter determinator 36 determines a value of a parameter related to the execution of the process in the cloud server 14 (hereinafter also referred to as "control parameter") so as to reduce the difference between the first time information and the second time information. The parameter setter 38 sets the value of the control parameter determined by the parameter determinator 36 in the cloud server 14.

The analysis information outputter 40 outputs analysis information generated by the analysis unit 34 and stored in the analysis information storage unit 26. The analysis information outputter 40 may transmit the analysis information to the user terminal and display the information, in response to a request from the terminal of a user (e.g., the developer of the virtual ECU) (not shown).

Alternatively, the analysis information outputter 40 may transmit the analysis information to a predetermined external storage apparatus and cause the external storage apparatus to store the information.

The operation of the development system 10 having the above configuration will be described. The monitoring VM of the automotive apparatus 12 transmits to the adjustment apparatus 16 the first log including the start time of a plurality of processes in the virtual ECU under test executed on the hypervisor for automotive implementation. The monitoring VM of the cloud server 14 transmits to the adjustment apparatus 16 the second log including the start time of a plurality of processes in the virtual ECU under test (the same as the one executed on the hypervisor for automotive implementation) executed on the general-purpose hypervisor. In a variation, the monitoring VM of the cloud server 14 and the monitoring VM of the automotive apparatus 12 may transmit the end time of the plurality of processes to the adjustment apparatus 16 instead of or in addition to the start time of the plurality of processes in the virtual ECU.

In the embodiment, the plurality of processes in the virtual ECU include a series of seven processes that are executed sequentially. For example, the plurality of processes in the virtual ECU may include the following processes 1-4.

Process 1: Process of drawing a screen once

Process 2: Audio playback process

Process 3: Process of downloading predetermined data via a network

Process 4: Process of compressing or decompressing a video

Figure 6:
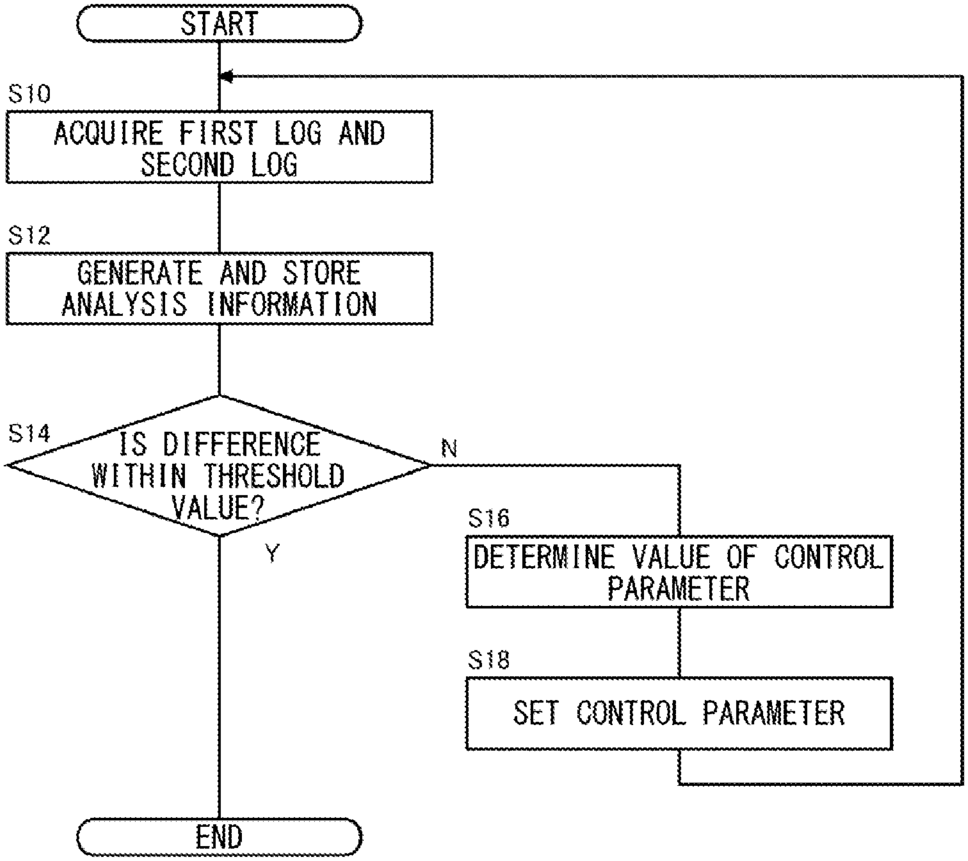
FIG. 6 is a flowchart illustrating the operation of the adjustment apparatus of the embodiment.

FIG. 6 is a flowchart illustrating the operation of the adjustment apparatus 16 of the embodiment. The first log acquisitioner 30 of the adjustment apparatus 16 acquires the first log transmitted from the automotive apparatus 12 and indicating the start time of each of the seven processes in the virtual ECU. The second log acquisitioner 32 of the adjustment apparatus 16 acquires the second log transmitted from the cloud server 14 and indicating the start time of each of the seven processes in the virtual ECU (S10).

The analysis unit 34 of the adjustment apparatus 16 generates analysis information related to the difference between the automotive apparatus 12 and the cloud server 14 based on the first log and the second log acquired in S10 (S12). When the difference between the first time information and the second time information indicated by the analysis information, i.e., the difference in processing speed between the automotive apparatus 12 and the cloud server 14 exceeds a predetermined threshold value (N in S14), the parameter determinator 36 of the adjustment apparatus 16 determines the value of the control parameter in the cloud server 14 so as to reduce the difference (S16).

The parameter setter 38 of the adjustment apparatus 16 sets the value of the control parameter determined in S16 in the cloud server 14 (S18). The parameter setter 38 may communicate with the monitoring VM of the cloud server 14 to cause the monitoring VM to execute a process of setting the value of the control parameter in the cloud server 14. When the difference between the first time information and the second time information indicated by the analysis information is within a predetermined threshold value (Y of S14), the illustrated process is terminated, i.e., the adjustment apparatus 16 terminates the adjustment process in the cloud server 14. The cloud server 14 continues to test the virtual ECU in the adjusted environment.

Figure 7:
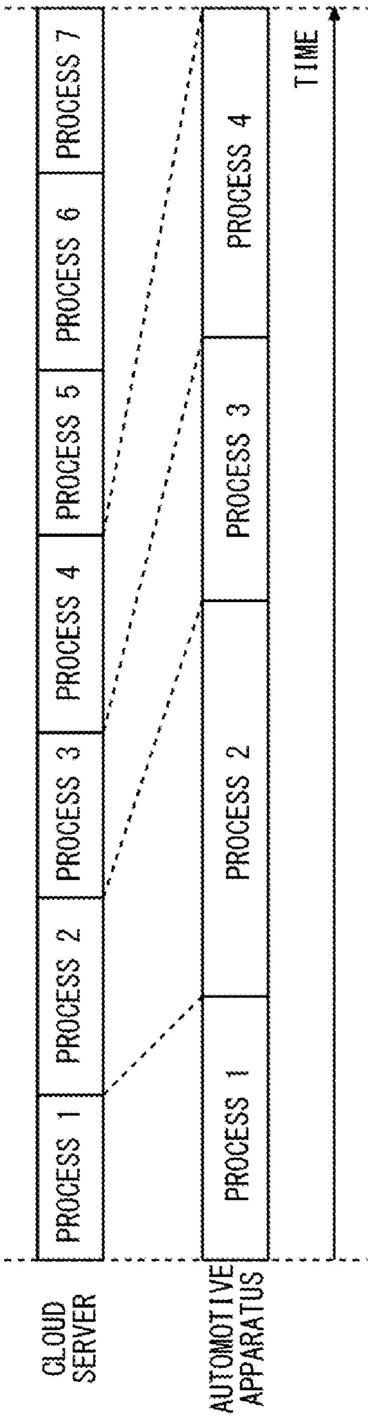
FIG. 7 schematically shows the difference in processing time between the automotive apparatus and the cloud server.

FIG. 7 schematically shows the difference in processing time between the automotive apparatus 12 and the cloud server 14. Referring to FIG. 7, at a point of time when the cloud server 14 completed the seven processes (process 1-process 7) in the virtual ECU, the automotive apparatus 12 has completed only four processes (process 1-process 4) in the virtual ECU.

Figure 8:
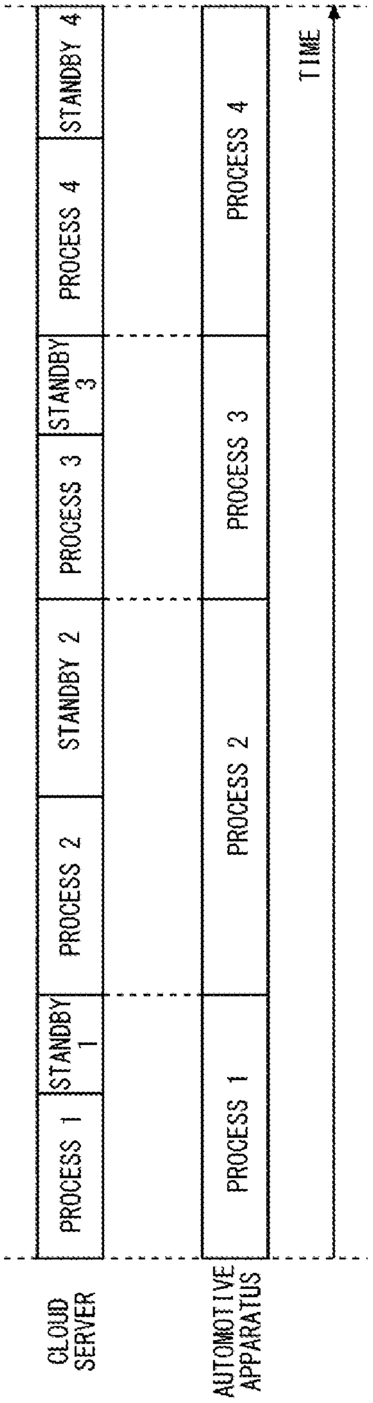
FIG. 8 schematically illustrates the adjustment process.

FIG. 8 schematically illustrates the adjustment process. In the example of FIG. 8, the adjustment apparatus 16 sets the control parameter of the cloud server 14 so as to provide a standby time for each process of the virtual ECU in the cloud server 14. The standby time can also be said to be the time when the process is not executed. Thereby, the difference between the time until the completion of the process 4 in the cloud server 14 and the time until the completion of the process 4 in the automotive apparatus 12 can be reduced. It should be noted that the adjustment apparatus 16 may define the time until the completion of the process 4 in the automotive apparatus 12 as a latency target and may adjust the control parameter of the cloud server 14 so as to approximate the time until the completion of the process 4 in the cloud server 14 to the latency target. For example, the adjustment apparatus 16 may set a standby time.

FIG. 9 shows an example of analysis information. In the second log transmitted from the cloud server 14 to the adjustment apparatus 16, the start time of process 1-process 7 in the cloud server 14 is recorded. The start time of process 7 (≈sum of processing time up to process 6) is "0.00713" seconds. The analysis unit 34 of the adjustment apparatus 16 calculates the processing time of process N (process 1-process 6) by calculating the start time of process N+1−the start time of process N. In the first log transmitted from the automotive apparatus 12 to the adjustment apparatus 16, the start time of process 1-process 4 in the automotive apparatus 12 is recorded. The analysis unit 34 calculates the processing time of process N (process 1-process 3) by calculating the start time of process N+1−the start time of process N.

Further, the analysis unit 34 calculates the difference in time required for executing each process between the cloud server 14 and the automotive apparatus 12. The total processing time difference is "0.00408" seconds. When the difference in processing time between the cloud server 14 and the automotive apparatus 12 exceeds a predetermined threshold value, the parameter determinator 36 of the adjustment apparatus 16 determines the value of the control parameter for reducing the difference. The threshold value may be determined appropriately by the knowledge of the developer or an experiment using the development system 10. The threshold may be, for example, "0.00100" seconds.

In the embodiment, the parameter determinator 36 of the adjustment apparatus 16 adjusts the allocation of the CPU to the virtual ECU process in the cloud server 14, using the cgroups function of the operating system of the cloud server 14 (e.g., Linux (registered trademark)). The parameter determinator 36 determines the value of the control parameter related to the cgroups.

Figure 10:
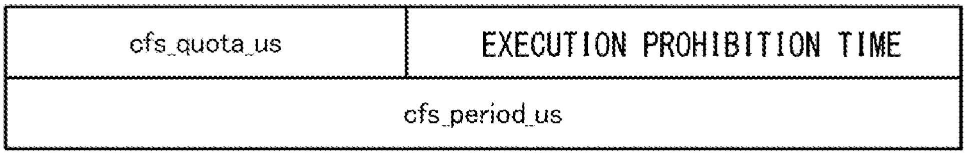
FIG. 10 shows examples of control parameters related to cgroups.

FIG. 10 shows examples of control parameters related to cgroups. "cpu.cfs_period_us" is an interval at which cgroups reallocates access to CPU resources, specified in microseconds. "cpu.cfs_quota_us" denotes a total time in which all tasks in cgroups are executed in a period of time defined by cpu.cfs_period_us, specified in microseconds. The difference between the time derined by cpu.cfs_period_us and the time defined by cpu.cfs_quota_us can be said to be execution prohibition time during which the allocation of CPU resources is prohibited.

In the example of FIG. 9, the parameter determinator 36 determines 7130 microseconds, which is the start time of process 7 (~sum of processing time up to process 6) in the cloud server 14 to be the value of cpu.cfs_period_us. Further, the execution inhibition time in the example of FIG. 9 is 4080 microseconds, which is the total processing time difference between the cloud server 14 and the automotive apparatus 12. Therefore, the parameter determinator 36 determines 3050 microseconds, which is the difference between 7130 microseconds and 4080 microseconds, to be the value of cpu.cfs_quota_us.

The parameter setter 38 transmits, to the monitoring VM of the cloud server 14, data designating that cpu.cfs_period_us should be set to 7130 microseconds and cpu.cfs_quota_us to 3050 microseconds. The monitoring VM sets the received control parameter value in the cloud server 14 (e.g., an OS, etc.).

In a variation, the control parameter may include a parameter other than cgroups. The control parameters may also include parameters that control system resources other than the CPU (e.g., memory, network, I/O).

The cloud server 14 and the automotive apparatus 12 execute tests of the virtual ECU a plurality of times. The analysis unit 34 of the adjustment apparatus 16 generates analysis information related to each test. The parameter determinator 36 of the adjustment apparatus 16 compares the processing time difference in each test between the cloud server 14 and the automotive apparatus 12 with the threshold value. When the processing time difference is equal to or less than the threshold value, the parameter determinator 36 terminates the adjustment process. Thereafter, the cloud server 14 executes only the test of the virtual ECU and suppresses generation and transmission of the second log. The virtual ECU that has been tested on the cloud server 14 is subsequently tested on the automotive apparatus 12.

Figure 11B:
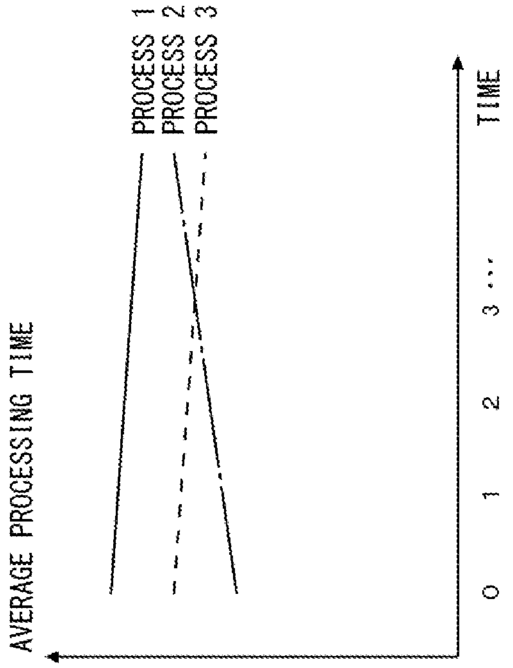
FIGS. 11A and 11B show examples of analysis information.
Figure 11A:
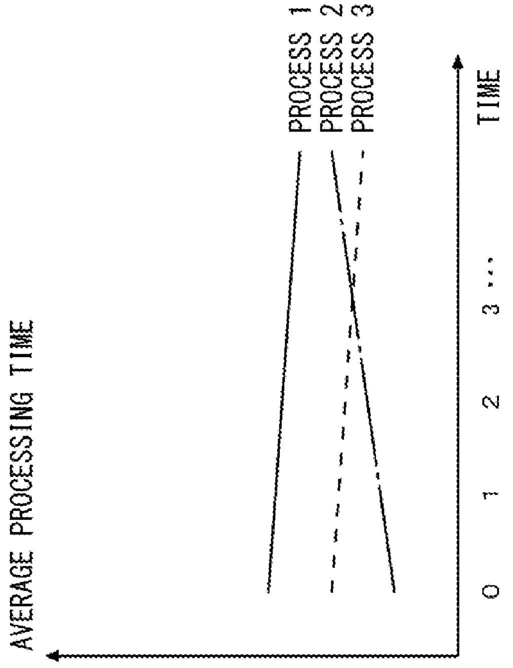

FIGS. 11A and 11B show examples of analysis information. Referring to the analysis information in FIG. 11A and the analysis information in FIG. 11B, the vertical axis represents average processing time, and the horizontal axis represents time. The graphs show a transition of the average processing time for each process of the virtual ECU. The solid-line graph shows a transition of the average processing time of process 1, the dashed-dotted line graph shows a transition of the average processing time of process 2, and the dashed-line graph shows the transition of the average processing time of process 3. The analysis information in FIG. 11A shows the average processing time in the cloud server 14, and the analysis information in FIG. 11B shows the average processing time in the automotive apparatus 12. Comparing FIG. 11A and FIG. 11B, it can be seen that the average processing time in the cloud server 14 is relatively short and the average processing time in the automotive apparatus 12 is relatively long.

The average processing time may be a moving average value of respective processes over a plurality of tests. For example, the average processing time of the first, second, and third processes may be plotted in the column at time 0, the average processing time of the second, third, and fourth processes may be plotted in the column at time 1, and the average processing time of the third, fourth, and fifth processes may be plotted in the column at time 2. Further, the analysis unit 34 may calculate the processing speed or performance index value based on the reciprocal of the processing time and may set the processing speed or performance index value in the vertical axis of the analysis information.

The analysis information outputter 40 of the cloud server 14 may transmit analysis information including the table shown in FIG. 9 and the graphs shown in FIGS. 11A and 11B to a predetermined external device. The destination of transmission of the analysis information may be, for example, the apparatus of the person in charge of developing the virtual ECU. The person in charge of developing the virtual ECU can check the analysis information to confirm how much the difference in processing time between the cloud server 14 and the automotive apparatus 12 has been reduced. Further, providing the analysis information to the person in charge of developing the virtual ECU helps the person in charge of development set the value of the control parameter of the cloud server 14 appropriately.

In cases where a virtual ECU developed and tested on the cloud server 14 having a relatively high processing speed is tested on the automotive apparatus 12 having a relatively low processing speed, the occurrence of rework caused by a difference in processing speed can be suppressed, and a decrease in the development efficiency of the virtual ECU can be suppressed in accordance with the development system 10 of the embodiment.

Further, the development system 10 of the embodiment is also useful to develop a next-generation model succeeding the current model of the virtual ECU. In this case, the current model of the virtual ECU may be used as a predetermined data process for measuring the processing time in the automotive apparatus 12 and the cloud server 14. According to this aspect, a decrease in development efficiency can be suppressed in the case a next-generation model of a virtual ECU is developed and tested on the cloud server 14 and tested on the automotive apparatus 12.

The development system 10 (adjustment apparatus 16) of the embodiment is useful for development of various software regardless of whether the development is carried out in a virtualized environment or whether a virtual ECU is developed. Further, it goes without saying that the development system 10 may be an on-premise server instead of the cloud server 14. The technology of the development system 10 of the embodiment can realize improvement in development efficiency in cases where software developed and tested on an apparatus with a relatively high processing speed is tested on an apparatus with a relatively low processing speed.

Given above is a description based on the embodiment. The embodiment is intended to be illustrative only and it will be understood by those skilled in the art that various modifications to combinations of constituting elements and processes of the embodiment are possible and that such modifications are also within the scope of the present disclosure.

The function of the adjustment apparatus 16 of the embodiment described above may be implemented in the cloud server 14. That is, the cloud server 14 according to a variation may have both the function of the cloud server 14 of the embodiment and the function of the adjustment apparatus 16 of the embodiment. In a variation, the function of the adjustment apparatus 16 of the embodiment may be implemented across a plurality of apparatuses. That is, the process in the adjustment apparatus 16 according to the embodiment may be realized by a system in which a plurality of apparatuses communicate and cooperate with each other.

Any combination of the embodiment and the variation described above will also be useful as an embodiment of the present disclosure. New embodiments created by the combination provide the advantages of embodiment and the variation combined. It will also be understood by skilled persons that the functions that the constituting elements recited in the claims should achieve are implemented either alone or in combination by the constituting elements shown in the embodiment and the variations.

<Additional Note>

The embodiment and the variations disclose the following technologies.

[Technology 1]

An information processing apparatus including:

a first acquisitioner that acquires first time information related to time in which a first apparatus executes a predetermined process;

a second acquisitioner that acquires second time information related to time in which a second apparatus executes the predetermined process, the second apparatus executing a test of software operating on the first apparatus and having a processing speed higher than that of the first apparatus;

a determinator that determines a value of a parameter related to execution of a process in the second apparatus so as to reduce a difference between the first apparatus and the second apparatus based on the first time information and the second time information; and a setter that sets the value of the parameter determined by the determinator in the second apparatus.

In cases where the software developed and tested on the second apparatus (e.g., a cloud server) is tested on the first apparatus (e.g., automotive hardware), the occurrence of rework caused by the difference in processing speed can be suppressed, and a decrease in the development efficiency of the software can be suppressed in accordance with this information processing apparatus.

[Technology 2]

The information processing apparatus according to Technology 1, wherein the parameter is a parameter to adjust CPU allocation to a process of testing the software.

According to this information processing apparatus, the difference between the execution time of the process in the automotive apparatus 12 and the execution time of the process in the cloud server 14 can be effectively reduced.

[Technology 3]

The information processing apparatus according to Technology 1 or 2, wherein the software is a virtual ECU (Electronic Control Unit), wherein the first apparatus is a automotive apparatus on which the virtual ECU operates, and wherein the second apparatus is a server on which the virtual ECU operates.

In cases where a virtual ECU developed and tested on the second apparatus is tested on the first apparatus, the occurrence of rework caused by the difference in processing speed can be suppressed, and a decrease in the development efficiency of the virtual ECU can be suppressed in accordance with this information processing apparatus.

[Technology 4]

The information processing apparatus according to any one of Technologies 1 through 3, further including:

an information outputter that outputs information indicating the difference between the first apparatus and the second apparatus based on the first time information and the second time information.

According to this information processing apparatus, the person in charge of developing the software can confirm how much the difference in processing time between the first apparatus and the second apparatus has been reduced. Further, this information processing apparatus helps the person in charge of software development set the value of the control parameter of the second apparatus appropriately.

[Technology 5]

An information processing system including:

a first acquisitioner that acquires first time information related to time in which a first apparatus executes a predetermined process;

a second acquisitioner that acquires second time information related to time in which a second apparatus executes the predetermined process, the second apparatus executing a test of software operating on the first apparatus and having a processing speed higher than that of the first apparatus;

a determinator that determines a value of a parameter related to execution of a process in the second apparatus so as to reduce a difference between the first time information and the second time information; and a setter that sets the value of the parameter determined by the determinator in the second apparatus.

In cases where the software developed and tested on the second apparatus (e.g., a cloud server) is tested on the first apparatus (e.g., automotive hardware), the occurrence of rework caused by the difference in processing speed can be suppressed, and a decrease in the development efficiency of the software can be suppressed in accordance with this information processing system.

[Technology 6]

A computer-implemented information processing method including:

acquiring first time information related to time in which a first apparatus executes a predetermined process;

acquires second time information related to time in which a second apparatus executes the predetermined process, the second apparatus executing a test of software operating on the first apparatus and having a processing speed higher than that of the first apparatus;

determining a value of a parameter related to execution of a process in the second apparatus so as to reduce a difference between the first time information and the second time information; and setting the value of the parameter determined in the second apparatus.

In cases where the software developed and tested on the second apparatus (e.g., a cloud server) is tested on the first apparatus (e.g., automotive hardware), the occurrence of rework caused by the difference in processing speed can be suppressed, and a decrease in the development efficiency of the software can be suppressed in accordance with this information processing method.

While various embodiments have been described herein above, it is to be appreciated that various changes in form and detail may be made without departing from the spirit and scope of the invention (s) presently or hereafter claimed.

CROSS-REFERENCE TO RELATED APPLICATION

This application is based upon and claims the benefit of priority from the prior Japanese Patent Application No. 2023-043009, filed on Mar. 17, 2023, the entire contents of which are incorporated herein by reference.

What is claimed is:

1. An information processing apparatus comprising:

a first acquisitioner circuit that acquires first time information related to time in which a first apparatus executes a predetermined process;

a second acquisitioner circuit that acquires second time information related to time in which a second apparatus executes the predetermined process, the second apparatus executing a test of software operating on the first apparatus and having a processing speed higher than that of the first apparatus;

a determinator circuit that determines a value of a parameter related to execution of a process in the second apparatus so as to reduce a difference between the first apparatus and the second apparatus based on the first time information and the second time information; and a setter circuit that sets the value of the parameter determined by the determinator circuit in the second apparatus, wherein the parameter is a parameter to adjust CPU allocation to a process of testing the software, and wherein the determinator circuit determines, as the parameter for adjusting the CPU allocation, a period during which CPU allocation is to be performed, based on (i) a processing start time of the second apparatus, and (ii) a total time obtained by summing a processing time difference between the first apparatus and the second apparatus.

2. The information processing apparatus according to claim 1, wherein the parameter is a parameter to adjust CPU allocation to a process of testing the software.

3. The information processing apparatus according to claim 1, wherein the software is a virtual ECU (Electronic Control Unit), wherein the first apparatus is an automotive apparatus on which the virtual ECU operates, and wherein the second apparatus is a server on which the virtual ECU operates.

4. The information processing apparatus according to claim 1, further comprising:

an information outputter circuit that outputs information indicating the difference between the first apparatus and the second apparatus based on the first time information and the second time information.

5. An information processing system comprising:

a first acquisitioner circuit that acquires first time information related to time in which a first apparatus executes a predetermined process;

a second acquisitioner circuit that acquires second time information related to time in which a second apparatus executes the predetermined process, the second apparatus executing a test of software operating on the first apparatus and having a processing speed higher than that of the first apparatus;

a determinator circuit that determines a value of a parameter related to execution of a process in the second apparatus so as to reduce a difference between the first time information and the second time information; and a setter circuit that sets the value of the parameter determined by the determinator circuit in the second apparatus, wherein the parameter is a parameter to adjust CPU allocation to a process of testing the software, and wherein the determinator circuit determines, as the parameter for adjusting the CPU allocation, a period during which CPU allocation is to be performed, based on (i) a processing start time of the second apparatus, and (ii) a total time obtained by summing a processing time difference between the first apparatus and the second apparatus.

6. A computer-implemented information processing method comprising:

acquiring first time information related to time in which a first apparatus executes a predetermined process;

acquiring second time information related to time in which a second apparatus executes the predetermined process, the second apparatus executing a test of software operating on the first apparatus and having a processing speed higher than that of the first apparatus;

determining a value of a parameter related to execution of a process in the second apparatus so as to reduce a difference between the first time information and the second time information; and setting the value of the parameter determined in the second apparatus, wherein the parameter is a parameter to adjust CPU allocation to a process of testing the software, and wherein the determining includes determining, as the parameter for adjusting the CPU allocation, a period during which CPU allocation is to be performed, based on (i) a processing start time of the second apparatus, and (ii) a total time obtained by summing a processing time difference between the first apparatus and the second apparatus.

* * * * *